United States Patent [19]

Yamamoto et al.

[11] Patent Number: 5,540,768
[45] Date of Patent: Jul. 30, 1996

[54] ALUMINUM PIGMENTS

[75] Inventors: Takashi Yamamoto, Tokyo; Takashi Matsufuji, Yamato-Koriyama; Takaaki Fujiwa, Otake; Terumasa Daito, Sakai, all of Japan

[73] Assignees: Toyo Aluminium Kabushiki Kaisha; Daicel Chemical Industries, Ltd., both of Japan

[21] Appl. No.: 336,129

[22] Filed: Nov. 4, 1994

[30] Foreign Application Priority Data

Nov. 9, 1993 [JP] Japan .................................. 5-279612

[51] Int. Cl.⁶ .................................................. C09C 1/62
[52] U.S. Cl. ............................................ 106/404; 106/479
[58] Field of Search ..................................... 106/404, 479

[56] References Cited

U.S. PATENT DOCUMENTS

| | | | |
|---|---|---|---|
| 4,621,112 | 11/1986 | Backhouse et al. | 524/145 |
| 4,717,424 | 1/1988 | Wilfinger et al. | 106/404 |
| 5,028,639 | 7/1991 | Treutlein et al. | 523/200 |
| 5,057,156 | 10/1991 | Kuwajima et al. | 106/404 |
| 5,151,125 | 9/1992 | Kuwajima et al. | 106/404 |
| 5,320,673 | 6/1994 | Carpenter | 106/404 |

FOREIGN PATENT DOCUMENTS

| | | |
|---|---|---|
| 659623 | 3/1963 | Canada . |
| 0133644 | 12/1985 | European Pat. Off. . |
| 0206140 | 12/1986 | European Pat. Off. . |
| 0583919 | 2/1994 | European Pat. Off. . |
| 34-9729 | 6/1957 | Japan . |
| 60-8057 | 2/1985 | Japan . |
| 61-47771 | 3/1986 | Japan . |
| 61-296072 | 12/1986 | Japan . |
| 54386 | 11/1989 | Japan . |
| 2053258 | 2/1981 | United Kingdom . |

OTHER PUBLICATIONS

EPO Search Report Dec. 21, 1994.
Database WPI, Week 9252, Derwent Publications Ltd., London, Great Britain; AN92–426415 & JP-A-4 318 181 (Nippon Paint) 9 Nov. 1992 *Abstract*.
Database WPI, Week 8513, Derwent Publications Ltd., London, Great Britain; AN 85–077465 & JP-A-60 029 401 (Pentel) 14 Feb. 1985 *abstract*.

*Primary Examiner*—Mark L. Bell
*Assistant Examiner*—Scott L. Hertzog
*Attorney, Agent, or Firm*—Nixon & Vanderhye

[57] ABSTRACT

An aluminum pigment which comprises aluminum flakes wherein the surfaces of the flakes are coated with a film of molybdic acid in an amount of from 0.1 to 10% by weight in terms of Mo metal based on the weight of aluminum, and a phosphoric ester resulting from an esterification reaction of a multifunctional epoxy compound with a phosphoric compound is adsorbed to said film in an amount of from 0.05 to 5% by weight in terms of P element based on the weight of aluminum. The aluminum pigment is excellent in paint stability as well as color tone, adhesion and moisture resistance of paint films.

6 Claims, No Drawings

ALUMINUM PIGMENTS

FIELD OF THE INVENTION

The present invention relates to aluminum pigments which are used for producing water base metallic paints, water base metallic inks and the like.

PRIOR ARTS

The aluminum pigments to be used for producing the water base metallic paints, the water base metallic inks and the like are described in several prior publications.

For example, JP-B-59009729 discloses a process in which an aluminum pigment is treated with an aqueous solution containing phosphoric acid or its salt. According to this treatment, an aluminum pigment which inhibits the production of hydrogen gas sufficiently and has a good stability in paint can be obtained, but this treatment gives defects that the color tone of the resulting paint film is spoiled by the treatment and that a whitening of the paint film occurs when the paint film is dipped in hot water due to a poor moisture resistance of the paint film. JP-B-85008057 discloses a process in which an aluminum pigment is treated with a phosphoric ester of lauryl alcohol or the like. According to this treatment, an aluminum pigment having a stability in paint and good color tone can be obtained, but an important defect of very poor paint film adhesion (adhesion between the pigment and a paint resin) is found.

Techniques for the treatment of aluminum pigments with acid phosphoric esters modified with organic functional groups are also described in several prior publications, but each technique is unsatisfactory. JP-B-85015466 discloses a modification of phosphoric ester with an aromatic ring-containing functional group and an amino group, but this treatment cannot give the satisfactory improvement in the paint film adhesion. JP-A-61296072 discloses an introduction of a carboxyl group into the terminal of a modification group, but both the stability in paint and the paint film adhesion of the resulting aluminum pigment are not satisfactory.

JP-B-89054386 discloses a process in which an aluminum pigment is treated with chromic acid. According to this treatment, an aluminum pigment which has a good stability in paint and gives excellent color tone of the resulting paint film can be obtained, and the paint film adhesion can be improved to a practically applicable level. However, since this treatment causes dissolution of aluminum flakes having fine particle sizes due to a high reactivity of the treatment, a fine aluminum pigment having an average particle size of $D_{50}$ <about 20 μm can hardly be produced. Further, serious industrial hygienic and environmental problems due to the use of a Cr(VI) compound are accompanied.

JP-A-61047771 (=U.S. Pat. No. 4621112) discloses a process in which a foam inhibitor comprising a reaction product of a specified epoxy resin with phosphoric acid is incorporated into a water-containing coating composition which contains a film-formable polymer, an untreated aluminum powder pigment and an aqueous dilution medium.

An object of the present invention is to provide an aluminum pigment which does not have the aforementioned defects involved in the prior arts and is excellent in the balance of stability in paint, color tone of the paint film, paint film adhesion and moisture resistance of the paint film.

SUMMARY OF THE INVENTION

The inventors of the present invention have found that an aluminum pigment which is satisfactory in terms of the balance of stability in paint, color tone of the paint film, paint film adhesion and moisture resistance of the paint film can be provided by coating the surfaces of aluminum flakes with a film of molybdic acid in an amount of from 0.1 to 10% by weight in terms of Mo metal based on the weight of aluminum, and adsorbing a phosphoric ester resulting from an esterification reaction of a multifunctional epoxy compound with a phosphoric compound to said film in an amount of from 0.05 to 5% by weight in terms of P element based on the weight of aluminum.

The present invention is characterized by the combination of a treatment with molybdic acid (to be referred to as "first treatment" hereinafter) and a subsequent treatment (to be referred to as "second treatment" hereinafter) with a phosphoric ester (to be referred to as "stabilizing agent" hereinafter) which is formed by an esterification reaction of a multifunctional epoxy compound with a phosphoric compound. The combination of the first and second treatments as a characteristic feature of the present invention is novel, and, though the aforementioned JP-A-61047771 discloses a process in which the aluminum pigment is contacted with the foam inhibitor comprising a reaction product of a specified epoxy resin with phosphoric acid, it does not teach a preliminary treatment of the aluminum pigment prior to said contact.

DETAILED DESCRIPTION OF THE INVENTION

The first treatment of the present invention comprises contacting an aluminum pigment with a first treatment agent in a water soluble solvent. Examples of usable water soluble solvents include ethylene glycol monobutyl ether (butyl cellosolve), diethylene glycol monobutyl ether, propylene glycol monomethyl ether, propylene glycol monobutyl ether, propylene glycol monopropyl ether and isopropyl alcohol.

The aluminum pigment to be subjected to the first treatment of the present invention is aluminum flakes produced by grinding or milling using a grinding agent in the presence of a grinding medium in a ball mill or an attritor mill. These flakes may have an average particle size ($D_{50}$) of preferably from about 1 to about 50 μm, particularly from about 10 to about 30 μm, from a view point of color tone. As the grinding agent, higher fatty acids such as oleic acid, stearic acid, isostearic acid, lauric acid, palmitic acid, myristic acid and the like are used generally, as well as aliphatic amines, aliphatic amides and aliphatic alcohols. As the grinding medium, a mineral oil having a high flash point such as mineral spirit, solvent naphtha or the like is used.

Desirably, the aluminum flakes may be washed in advance with a water soluble solvent which is used for the treatment so that they are easily wet with the treating solution. Especially, when the grinding medium is incompatible with the treating solution, it is effective to replace the grinding medium with an appropriate solvent in advance at the time of washing.

Ammonium molybdate is desirable as the first treating agent. Usable ammonium molybdate is either of ortho-, meta- or para-molybdate. Alkali or alkaline earth metal molybdate, though soluble in water, is not preferable for the treatment of the aluminum flakes, because its alkaline strength is too high and, if the alkali or alkaline earth metal remains in the paint film, the remaining alkali or alkaline earth metal may affect the properties of the paint film. In the preparation of the treating solution, ammonium molybdate is preferably dissolved in a mixture of water and the water-soluble solvent so that it is contained at the concentration of a few % or less (0.4% for example).

When the aluminum flakes are reacted with the treating solution, the treating solution should be alkaline. In general, the pH of the treating solution is 7 to 10, preferably 7.5 to 9.5 and more preferably 8 to 9. When the pH is less than 7, the reaction with aluminum proceeds very slowly (the dissolution of aluminum is happened at an acidic level which is out of the passive zone), and, when the pH is above 10, the rapid reaction is happened and as the result, the aluminum pigment excellent in the color tone cannot be obtained.

The first treatment is completed by removing the water and unreacted reactants from the reaction system. After completion of the first treatment, the reaction product is washed and filtered and then subjected to the second treatment. When cake of the aluminum pigment after the first treatment contains water, it is desirable to replace the water with the aforementioned water-soluble solvent prior to the second treatment. When to be stored at this stage, it is effected by dispersing the washed and filtered cake in the aforementioned water-soluble solvent or the like.

The amount of the film of molybdic acid thus formed by the first treatment is in the range of from 0.1 to 10% by weight in terms of Mo metal based on the weight of aluminum. When it is less than the lower limit, the stability in paint is poor and the inhibition of the hydrogen gas production due to the reaction with water in the water base paint is insufficient, and when it is above the upper limit, the film is too thick and as a result, the color tone thereof is impaired. Preferred range is from 0.1 to 3% by weight.

The second treatment of the present invention comprises treating the first-treated aluminum pigment with a stabilizing agent. The stabilizing agent to be used in the second treatment is a phosphoric ester formed by the esterification reaction of a multifunctional epoxy compound with a phosphoric compound. This phosphoric ester is disclosed in Japanese Patent Application No. 5-191745, Japanese Patent Application No. 5-191746 and Japanese

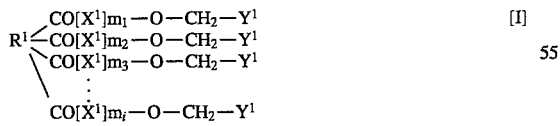

wherein $R^1$ represents an alkyl or alkenyl group having 1 to 30 carbon atoms or $y_1$, $X^1$ is a group represented by a formula $-O-(CR_aR^b-)_cCO-$ where $R^a$ and $R^b$ may be the same or different from each other and each represents a hydrogen atom, a methyl group or an ethyl group and c is an integer of 4 to 8, $y^1$ is a hydroxycyclohexane backbone having a phosphate group represented by the following formula (1)

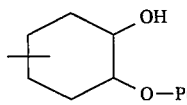

and $m_1+m_2+m_3 \ldots m_i$ is 0 to a 30.

General formula [II]:

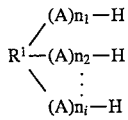

wherein $R^2$ represents a residue of an organic compound having i active hydrogen atoms, each of $n_1$, n2, n3 ... $n_i$ is 0 or an integer of 1 to 30, with their total being 1 to 100, i is an integer of 1 to 10 and represents the number of active hydrogen atoms in $R^2$, and A is an oxycyclohexane backbone having a substituent $X^2$ represented by the following formula (2)

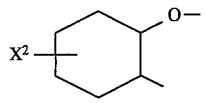

where $X^2$ is a group represented by any one of the following formulae (3) to (6)

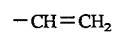

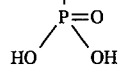

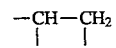

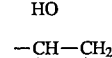

in which R' represents a hydrogen atom, an alkyl group, an alkylcarbonyl group or an arylcarbonyl group, with the proviso that the compound represented by the general formula [II] contains at least one group having the phosphate group of formula (4) or (5).

General formula [III]:

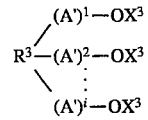

wherein $R^3$ represents an alkyl or alkenyl group having 1 to 20 carbon atoms,

A' represents an alkyl or alkenyl group having 1 to 20 carbon atoms, $X^3$ is a group represented by a formula $-P(=O)(OH)_2$, and i is an integer of 1 to 10.

Typical examples of the phosphoric ester compounds having the general formula [I] include: a phosphoric acid addition product of an epoxy compound (Epolead GT400, manufactured by DAICEL CHEMICAL INDUSTRIES, LTD.) having the following formula (I-1)

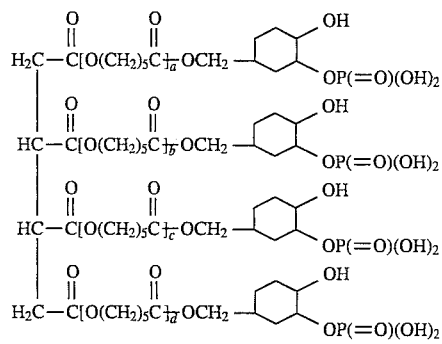

wherein a+b+c+d=0; a phosphoric acid addition product of an epoxy compound (Epolead GT401, manufactured by DAICEL CHEMICAL INDUSTRIES, LTD.) having the following formula (I-2)

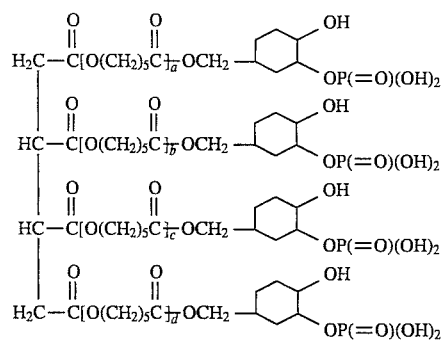

wherein a+b+c+d=1;
a phosphoric acid addition product of an epoxy compound (Epolead GT403, manufactured by DAICEL CHEMICAL INDUSTRIES, LTD.) having the following formula (I-3)

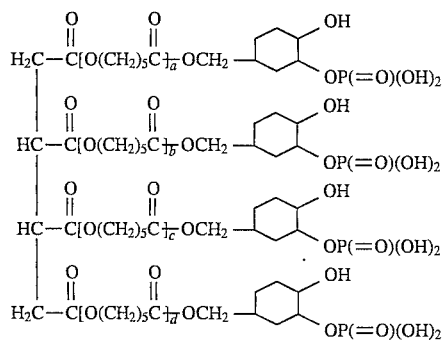

wherein a+b+c+d =3;
a phosphoric acid addition product of an epoxy compound (Epolead GT300, manufactured by DAICEL CHEMICAL INDUSTRIES, LTD.) having the following formula ( I-4)

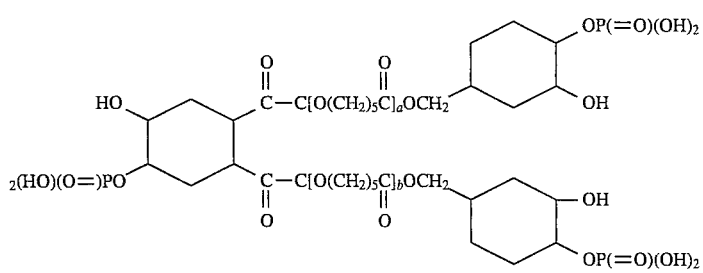

wherein a+b=0;
a phosphoric acid addition product of an epoxy compound (Epolead GT302, manufactured by DAICEL CHEMICAL INDUSTRIES, LTD.) having the following formula ( I-5)

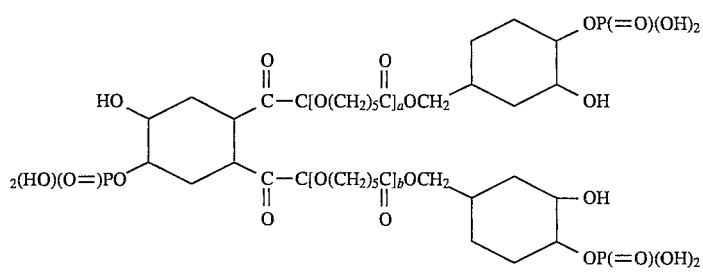

wherein a+b=2; a phosphoric acid addition product of an epoxy compound (Celloxide 2081, manufactured by DAICEL CHEMICAL INDUSTRIES, LTD.) having the following formula (I-6)

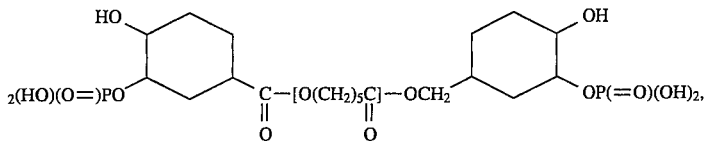

a phosphoric acid addition product of an epoxy compound (Celloxide 2083, manufactured by DAICEL CHEMICAL INDUSTRIES, LTD.) having the following formula (I-7)

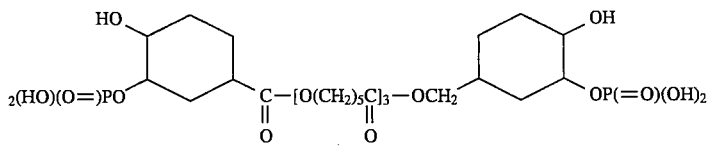

wherein n=3; and
a phosphoric acid addition product of an epoxy compound (Celloxide 2085, manufactured by DAICEL CHEMICAL INDUSTRIES, LTD.) having the following formula (I-8)

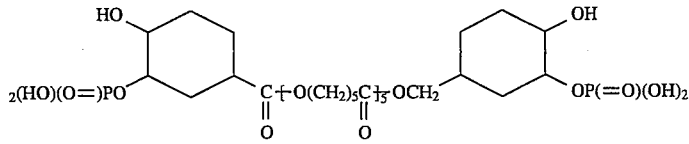

A typical example of the phosphoric ester compounds having the general formula [II] is a phosphoric acid addition product of an alicyclic epoxy compound (EHPE3150, manufactured by DAICEL CHEMICAL INDUSTRIES, LTD.) having the following formula

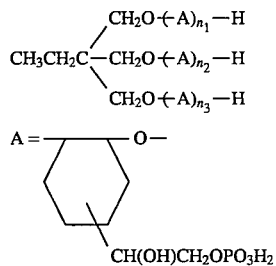

wherein $n_1+n_2+n_3=15$.

Typical examples of the phosphoric ester compounds having the general formula [III] include a phosphoric acid addition product of propylene glycol diglycidyl ether, a phosphoric acid addition product of diethylene glycol diglycidyl ether, a phosphoric acid addition product of trimethylolpropane triglycidyl ether and a phosphoric acid addition product of pentaerythritol tetraglycidyl ether.

Processes for the production of the phosphoric esters to be used as the stabilizing agent in the second treatment of the present invention are described in the specifications of the aforementioned Japanese patent applications.

Preferably, the second treatment of the present invention may be effected by dissolving the stabilizing agent in a polar solvent such as isopropyl alcohol, ethylene glycol, butyl cellosolve, propylene glycol monopropyl ether or the like, adding a predetermined amount of the resulting solution to the first-treated cake put in a kneading device such as a mixer and then kneading the mixture. The stabilizing agent may be used in an amount of from 0.05 to 5% by weight, preferably from 0.1 to 1% by weight, in terms of the phosphorus content based on the weight of aluminum. The amount if smaller than 0.05% by weight would bear no sufficient effect to inhibit gas production in the water base paints, and if larger than 5% by weight would cause reduction of the moisture resistance of paint films, thus entailing poor color tone and paint film adhesion after a hot water resistance test.

The aluminum pigment thus obtained by the second treatment has a double-layer structure in which the surfaces of the aluminum flakes are coated with a film of molybdic acid in an amount of from 0.1 to 10% by weight in terms of Mo metal based on the weight of aluminum, and the surface of the resulting film layer is further coated with the stabilizing agent in an amount of from 0.05 to 5% by weight in terms of phosphorus content based on the weight of aluminum.

Advantageous Effects of Invention

According to the present invention, effects of the stabilizing agent to be used in the second treatment is further improved by the synergistic effect of the first treatment with molybdic acid and the second treatment with the stabilizing agent. Since the amount of the stabilizing agent to be added can be reduced greatly, defects originated from the use of phosphorus-type additives i.e. the decrease in the color tone and adhesion of paint films after the hot water resistance test can be controlled to the minimum level, hence rendering possible production of the aluminum pigment having unexpectedly excellent balance of properties including stability in paint, color tone of paint film, paint film adhesion and moisture resistance of paint films.

In addition, according to the stabilizing agent of the present invention, the multifunctional epoxy compound as one of the starting materials of the stabilizing agent takes a role in keeping the adhesion between the aluminum pigment and a paint resin when baked in the paint film due to its strong cohesive force, thus rendering possible improvement of the poor film adhesion which is commonly observed in the case of the use of usual phosphorus-type compounds such as phosphoric esters.

In the case of a process disclosed in JP-A-61047771 in which the foam inhibitor comprising a reaction product of an epoxy resin and phosphoric acid is contacted with the aluminum powder pigment, the effects of the inhibitor cannot fully be exerted because of the absence of the first treatment of the pigment, thus entailing a difficulty in obtaining an aluminum pigment having satisfactory properties such as stability in paint as well as color tone and adhesion of paint films after the hot water resistance test (see Comparative Example 4 which will be described later). In the same patent, kinds of epoxy resins are considerably limited in order to prevent the defects caused by the use of phosphorus-type compounds, but still resulting in insufficient properties. According to the present invention, since the first treatment is applied to the aluminum pigment, such defects caused by phosphorus-type compounds can be reduced greatly, degree of influences by the structure of epoxy compounds is small and the stabilizing agent can be selected from a broad range of compounds.

EXAMPLES

The following examples are provided to further illustrate the present invention.

Reference Example 1

Preparation of stabilizing agent A (compound of general formula II)

A mixture consisting of 40 g of an epoxy resin (EHPE 3150, manufactured by DAICEL CHEMICAL INDUSTRIES, LTD.) and 40 g of propylene glycol monopropyl ether was added dropwise to a mixture consisting of 21.5 g of 100% phosphoric acid which has been prepared by mixing 100 g of 85% phosphoric acid with 40 g of diphosphorus pentoxide in that ratio and 26.0 g of propylene glycol monopropyl ether, taking about 1 hour for the dropwise addition while temperature of the resulting mixture increased to about 90° C. by the heat of reaction. After the exothermic reaction, the temperature was controlled at 90° C. for about 2 hours. After completion of the reaction, the reaction mixture was cooled and its solid matter was adjusted to 65% with propylene glycol monopropyl ether. The oxirane oxygen concentration in the crude reaction solution after cooling was found to be 0.

Reference Example 2

Preparation of stabilizing agent B compound of general formula I)

A mixture consisting of 40 g of an epoxy resin (Celloxide 2085, manufactured by DAICEL CHEMICAL INDUSTRIES, LTD.) and 16 g of propylene glycol monopropyl ether was added dropwise to a mixture consisting of 8.5 g of 100% phosphoric acid which has been prepared by mixing 100 g of 85% phosphoric acid with 40 g of diphosphorus pentoxide in that ratio and 25 g of propylene glycol monopropyl ether, taking about 1 hour for the dropwise addition. Similar to the case of the stabilizing agent A, temperature after the exothermic reaction was controlled at 90° C. for about 2 hours. After completion of the reaction, the reaction mixture was cooled and its solid matter was adjusted to 65% with propylene glycol monopropyl ether. The oxirane oxygen concentration in the crude reaction solution after cooling was found to be 0.

Reference Example 3

Preparation of stabilizing agent C (compound of general formula III)

40 g of neopentyl glycol diglycidyl ether was added dropwise to a mixture consisting of 25.6 g of 100% phosphoric acid which has been prepared by mixing 100 g of 85% phosphoric acid with 40 g of diphosphorus pentoxide in that ratio and 64 g of propylene glycol monopropyl ether, taking about 1 hour for the dropwise addition. Similar to the case of the stabilizing agent A, temperature after the exothermic reaction was controlled at 90° C. for about 2 hours. After completion of the reaction, the reaction mixture was cooled and its solid matter was adjusted to 65% with propylene glycol monopropyl ether. The oxirane oxygen concentration in the crude reaction solution after cooling was found to be 0.

Reference Example 4

Preparation of stabilizing agent D (comparative compound)

The Compound of this reference example was prepared in accordance with the Inventive Example I disclosed in JP-A-61047771.

A mixture consisting of 42 g of an epoxy resin (Epikote 828, manufactured by Yuka Shell Epoxy K.K.) and 33.2 g of phenyl glycidyl ether was added dropwise to a mixture consisting of 24.6 g of 88% orthophosphoric acid and 0.2 g of triethylamine, taking about 1 hour for the dropwise addition while temperature of the resulting mixture increased to about 120° C. by the heat of reaction. After the exothermic reaction,. the temperature was controlled at 110° C. for about 2 hours. After completion of the reaction, the reaction mixture was cooled and its solid matter was adjusted to 65% by diluting the mixture with propylene glycol monopropyl ether while the reaction product was still viscous. Thereafter, the reaction product was neutralized with 19.7 g of triethylamine. The oxirane oxygen concentration in the crude reaction solution after cooling was found to be 0.

Examples 1 to 9

First treatment of aluminum pigment

Aluminum flakes (Alpaste®7675NS, $D_{50}$=14 82 m, manufactured by Toyo Aluminium K.K.) were weighed so that 200 g in terms of aluminum was present, and placed in a 3 liter capacity beaker to which 1 liter of propylene glycol monomethyl ether was subsequently added and then stirred at 400 rpm to prepare a dispersion of aluminum flakes, and the whole was cooled to a liquid temperature of 18° C. To this was gradually added a reaction solution which has been prepared in advance by dissolving 5.0 g of ammonium paramolybdate in 200 ml of deionized water, subsequently stirring the resulting mixture at 400 to 450 rpm to carry out 1 hour of reaction at pH 8.5 and at a liquid temperature of 15 to 20° C. The resulting reaction mixture was decanted with deionized water three times so as to remove ammonium ions and unreacted ammonium paramolybdate and then filtered through a glass filter with suction. Thereafter, the aluminum flakes on the filter were washed with propylene glycol monomethyl ether three times so as to completely remove the water and finally filtered with suction, thereby obtaining a first-treated aluminum pigment.

Second treatment of aluminum pigment

The thus obtained first-treated aluminum pigment was mixed with each of the stabilizing agents and butyl cellosolve in respective amounts shown in Table 1 and subjected to 30 minutes of kneading in a mixer and then to 2 days of aging in a constant temperature oven of 50° C.

The Mo content in each of the second-treated aluminum pigments was measured by ICP emission spectrophotometry, with the results shown in Table 1 in terms of Mo metal based on the weight of aluminum. The P content shown in Table 1 is a calculated value.

Comparative Example 1

The aluminum flakes (Alpaste®7675NS, $D_{50}$=14 μm, produced by Toyo Aluminium K.K.) as the starting material in the first treatment of Example 1 were used after replacement with propylene glycol monomethyl ether in order to be easily dispersed in the water base resin.

Comparative Example 2

The aluminum flakes (Alpaste®7675NS, $D_{50}$=14 μm, produced by Toyo Aluminium K.K.) as the starting material in the first treatment of Example 1 were subjected only to the first treatment.

Comparative Example 3

Commercially available water base Alpaste®WXM 7675 (produced by Toyo Aluminium K.K.) was used.

Comparative Example 4

The aluminum flakes (Alpaste®7675NS, $D_{50}$=14 μm, produced by Toyo Aluminium K.K.) as the starting material in the first treatment of Example 1 were subjected only to the second treatment with the stabilizing agent D.

Test Example

Preparation of water base metallic paint
The following materials:
- water-soluble acrylic resin 58.43 g neutralized with triethylamine
  (ALMATEX®WA 911, produced by MITSUI TOATSU CHEMICALS, INC.)
- melamine resin (Cymel®350, produced 8.80 g by MITSUI CYANAMID)
- aluminum pigment (as metal Al) 6.00 g
- deionized water 80.00 g were thoroughly stirred and dispersed by hand followed by stirring by means of a disperser at 1,000 rpm for about 10 minutes. Then, its pH was adjusted with 10% triethylamine to be 8.6. Its viscosity was adjusted with deionized water to be 19 to 20 seconds by the determination using #4 Ford cup.

Preparation of oily clear paint
The following materials:
- acrylic resin (ACRYDIC® A-345, produced 130 g by DAINIPPON INK AND CHEMICALS INC.)
- melamine resin (SUPER BECKAMINE® L-117-60, 50 g produced by DAINIPPON INK AND CHEMICALS INC.)
- Solvesso® 100 70 g were dispersed by hand. Viscosity of the thus prepared clear paint was 20 seconds by the determination using #4 Ford cup.

Coating method

A steel plate which has been coated in advance with a primer was coated with the water base metallic paint using a SA71 spray gun manufactured by IWATA TOSOKI KOGYO K.K. and an automatic air coating device Model 310741 manufactured by SPRAYMATION INC. so that the dried film had 13 μm in thickness and subjected to 10 minutes of preliminary drying in an air oven of 90° C. and then the oily clear paint was coated so that the dried film had 40 μm in thickness followed by baking to cure in the air oven of 160° C. for 30 minutes, thereby obtaining test pieces.

Items tested

1. Stability in paint

A 80 g portion of the water base metallic paint which was not subjected to the viscosity adjustment was introduced in a flask, which was set on a water bath whose temperature was controlled to be 50° C. to observe the cumulative volume of hydrogen gas produced for 10 days. The lower the cumulative volume of hydrogen gas is, the higher the stability in paint is.

2. Initial coating properties

The color tone of the test pieces after completion of coating, namely luster of the paint film (IV value), was determined using a color measurement machine "ALCOPE", Model LMR-100, manufactured by KANSAI PAINT CO., Ltd. The paint film adhesion was determined by 6 ranks in accordance with the procedure of ASTM $D_{3359}$ B. 3B or more is evaluated to be acceptable.

3. Resistance of paint film in hot water

After the test piece was dipped in hot water of 50° C. for 10 days, the adhesion of the paint film was determined in the same manner as described above to examine changes in the paint film adhesion before and after the 10 days of dipping in hot water of 50° C. Also, the change in the whitening degree of the dipped part was compared with the color tone of the non-dipped part. The whitening degree was determined with the naked eye, and the results were expressed by a double circle when no change in color tone was observed, a single circle when only a slight change was observed, a triangle when judged border line and a cross when significant change was observed.

TABLE 1

| | Examples | | | | | | |
|---|---|---|---|---|---|---|---|
| | 1 | 2 | 3 | 4 | 5 | 6 | 7 |
| Second treatment of aluminum pigment | | | | | | | |
| First-treated aluminum pigment (NV 75%) | 100 pbw | 100 pbw | 100 pbw | 100 pbw | 100 pbw | 100 pbw | 100 pbw |
| Type of stabilizing agent | A | A | A | B | B | B | C |

TABLE 1-continued

|  |  |  |  |  |  |  |  |
|---|---|---|---|---|---|---|---|
| Amount of stabilizing agent (NV 65%) | 2.1 pbw | 5.2 pbw | 10.4 pbw | 4.4 pbw | 10.9 pbw | 21.9 pbw | 1.9 pbw |
| Butyl cellosolve | 34.3 pbw | 31.2 pbw | 26.0 pbw | 32.0 pbw | 25.5 pbw | 14.5 pbw | 34.5 pbw |
| Mo content | 0.67% | 0.67% | 0.67% | 0.67% | 0.67% | 0.67% | 0.67% |
| P content | 0.2% | 0.5% | 1.0% | 0.2% | 0.5% | 1.0% | 0.2% |
| Al content (%) | 55.0 | 55.0 | 55.0 | 55.0 | 55.0 | 55.0 | 55.0 |
| Aging condition | 50° C. × 2 days | 50° C. × 2 days | 50° C. × 2 days | 50° C. × 2 days | 50° C. × 2 days | 50° C. × 2 days | 50° C. × 2 days |
| Paint making |  |  |  |  |  |  |  |
| Aluminum pigment (as Al content) | 10.90 (6.0) | 10.90 (6.0) | 10.90 (6.0) | 10.90 (6.0) | 10.90 (6.0) | 10.90 (6.0) | 10.90 (6.0) |
| Varnish A *1) | 56.32 | 56.32 | 56.32 | 56.32 | 56.32 | 56.32 | 56.32 |
| Triethylamine | 2.11 | 2.11 | 2.11 | 2.11 | 2.11 | 2.11 | 2.11 |
| Varnish B *2) | 8.8 | 8.8 | 8.8 | 8.8 | 8.8 | 8.8 | 8.8 |
| Deionized water | 80.0 | 80.0 | 80.0 | 80.0 | 80.0 | 80.0 | 80.0 |
| pH (after adjustment) | 8.6 | 8.6 | 8.6 | 8.6 | 8.6 | 8.6 | 8.6 |
| Viscosity (sec) | 19.0 | 19.6 | 19.0 | 19.4 | 19.5 | 19.8 | 19.5 |

|  | Examples | | Comparative Examples | | | | |
|---|---|---|---|---|---|---|---|
|  | 8 | 9 | 1 | 2 | 3 | 4 | 5 |
| Second treatment of aluminum pigment |  |  |  |  |  |  |  |
| First-treated aluminum pigment (NV 75%) | 100 pbw | 100 pbw | Alpaste 7675NS | first-treated Al pigment | Alpaste WXM7675 | Alpaste 7675NS 100 pbw | Alpaste 7675NS 100 pbw |
| Type of stabilizing agent | C | C |  |  |  | D | A |
| Amount of stabilizing agent (NV 65%) | 4.7 pbw | 9.4 pbw |  |  |  | 4.4 pbw | 5.2 pbw |
| Butyl cellosolve | 31.7 pbw | 27.0 pbw |  |  |  | 13.6 pbw | 12.8 pbw |
| Mo content | 0.67% | 0.67% | 0% | 0.67% | 0% | 0% | 0% |
| P content | 0.5% | 1.0% | 0% | 0% | 0.32% | 0.33% | 0.5% |
| Al content (%) | 55.0 | 55.0 | 65.0 | 75.0 | 65.0 | 55.0 | 55.0 |
| Aging condition | 50° C. × 2 days | 50° C. × 2 days |  |  |  | 50° C. × 2 days | 50° C. × 2 days |
| Paint making |  |  |  |  |  |  |  |
| Aluminum pigment (as Al content) | 10.90 (6.0) | 10.90 (6.0) | 9.23 (6.0) | 8.00 (6.0) | 9.23 (6.0) | 10.90 (6.0) | 10.90 (6.0) |
| Varnish A *1) | 56.32 | 56.32 | 56.32 | 56.32 | 56.32 | 56.32 | 56.32 |
| Triethylamine | 2.11 | 2.11 | 2.11 | 2.11 | 2.11 | 2.11 | 2.11 |
| Varnish B *2) | 8.8 | 8.8 | 8.8 | 8.8 | 8.8 | 8.8 | 8.8 |
| Deionized water | 80.0 | 80.0 | 80.0 | 80.0 | 80.0 | 80.0 | 80.0 |
| pH (after adjustment) | 8.6 | 8.6 | 8.6 | 8.6 | 8.6 | 8.6 | 8.6 |
| Viscosity (sec) | 19.3 | 19.7 | 19.0 | 19.5 | 19.3 | 19.7 | 19.7 | varnish A *1) Almatex WA 911 (a water-soluble acrylic resin manufactured by Mitsui Toatsu Chemicals, Inc.)
varnish B *2) Cymel 350 (a melamine resin manufactured by Mitsui Cyanamid)
pbw = part(s) by weight

TABLE 2

|  | Gas volume | Coating properties | | | |
|---|---|---|---|---|---|
|  |  | initial | | after dipping in hot water | |
|  | (ml/1 g Al) | IV value | adhesion | whitening | adhesion |
| Ex. 1 | 0.22 | 265 | 5B | ⊚ | 5B |
| Ex. 2 | 0.11 | 235 | 5B | ⊚ | 5B |
| Ex. 3 | 0.0 | 228 | 5B | ○ | 5B |
| Ex. 4 | 2.9 | 252 | 5B | ⊚ | 5B |
| Ex. 5 | 0.0 | 258 | 5B | ○ | 5B |
| Ex. 6 | 0.0 | 234 | 5B | Δ | 5B |
| Ex. 7 | 0.0 | 252 | 5B | ○ | 5B |
| Ex. 8 | 0.0 | 258 | 5B | ○ | 5B |
| Ex. 9 | 0.0 | 234 | 5B | Δ | 5B |
| Comp. Ex. 1 | >20.0 | 271 | 5B | ⊚ | 5B |
| Comp. Ex. 2 | 6.4 | 228 | 5B | ⊚ | 3B |
| Comp. Ex. 3 | 0.76 | 267 | 5B | X | 5B |
| Comp. Ex. 4 | 2.88 | 283 | 5B | X | 3B |
| Comp. Ex. 5 | 5.5 | 238 | 5B | Δ | 3B |

We claim:

1. An aluminum pigment which comprises aluminum flakes wherein the surfaces of the flakes are coated with a film of molybdic acid in an amount of from 0.1 to 10% by weight in terms of Mo metal based on the weight of aluminum, and a phosphoric ester resulting from an esterification reaction of a multifunctional epoxy compound with a phosphoric compound is adsorbed to said film in an amount of from 0.05 to 5% by weight in terms of P element based on the weight of aluminum.

2. The aluminum pigment according to claim 1 wherein said phosphoric ester is represented by any one of the following general formulae:

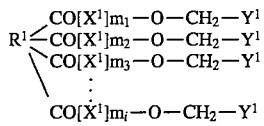

wherein $R^1$ represents an alkyl or alkenyl group having 1 to 30 carbon atoms or $Y^1$, $X^1$ is a group represented by a formula $-O-(CR^aR^b)_cCO-$ where $R^a$ and $R^b$ may be the same or different from each other and each represents a hydrogen atom, a methyl group or an ethyl group and c is an integer of 4 to 8, $Y^1$ is a hydroxycyclohexane backbone having a phosphate group represented by the following formula (1)

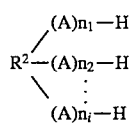

and $m_1+m_2+m_3 \ldots m_i$ is 0 to 30;

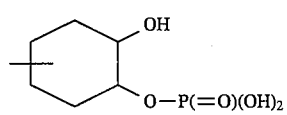

wherein $R^2$ represents a residue of an organic compound having i active hydrogen atoms, each of $n_1, n_2, n_3 \ldots n_i$ is 0 or an integer of 1 to 30, with their total being 1 to 100, i is an integer of 1 to 10 and represents the number of active hydrogen atoms in $R^2$, and A is an oxycyclohexane backbone having a substituent $X^2$ represented by the following formula (2)

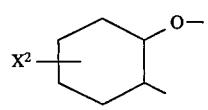

where $X^2$ is a group represented by any one of the following formulae (3) to (6)

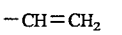

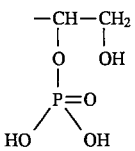

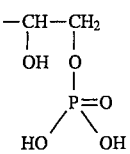

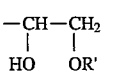

in which R' represents a hydrogen atom, an alkyl group, an alkylcarbonyl group or an arylcarbonyl group, with the proviso that the compound represented by the general formula [II] contains at least one group having the phosphate group of formula (4) or (5); and

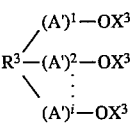

wherein $R^3$ represents an alkyl or alkenyl group having 1 to 20 carbon atoms,

A' represents an alkyl or alkenyl group having 1 to 20 carbon atoms, $X^3$ is a group represented by a formula $-P(=O)(OH)_2$, and i is an integer of 1 to 10.

3. A water base metallic paint or ink which comprises the aluminum pigment as defined in claim 1.

4. A metallic paint composition which comprises the aluminum pigment as defined in claim 1.

5. A paint film obtained by coating the water base metallic paint as defined in claim 3 on a substrate followed by drying.

6. A print film obtained by printing the water base ink as defined in claim 3 on a substrate followed by drying.

* * * * *